United States Patent Office

2,910,480
Patented Oct. 27, 1959

2,910,480

VINYLATION OF MERCAPTANS

Henry J. Schneider, Hatboro, Pa., assignor to Rohm & Haas Company, Philadelphia, Pa., a corporation of Delaware No Drawing. Application September 13, 1957
Serial No. 683,699

15 Claims. (Cl. 260—306)

This invention deals with processes for vinylating mercaptans by causing acetylene to act thereon at an elevated temperature and in the presence of a catalyst. In particular, it is concerned with the use of certain weakly basic catalysts in such mercaptan vinylation reactions. Such catalysts, which include inorganic compounds such as sodium carbonate, ammonia and organic amines including amine-based ion-exchange materials, have been found to function as efficiently as strongly basic catalysts, and to have an additional, important advantage in that they function well in instances where strongly basic catalysts are entirely inoperative due to the occurrence of undesirable side reactions when they are employed.

The general mercaptan vinylation reaction, as herein discussed, is well known to those familiar with the prior art in this field. A typical illustration thereof is to be found in Reppe, U.S. Patent No. 2,081,766. The catalysts employed, as described in that patent, have been strongly basic metal compounds such as oxides, hydroxides, etc. It has been characteristic of the prior art that, when the reaction of a particular mercaptan and acetylene would not work, stronger and stronger bases were employed as the catalyst. I have now found that the solution to this problem heretofore has been sought for in the wrong direction; i.e., more weakly basic catalysts provide the answer, and work well in such instances as the preparation of vinylthiobenzothiazole by vinylation of mercaptobenzothiazole, or in the vinylation of monothioglycerol, processes in which the use of strongly basic catalysts such as disclosed by Reppe has been found unsatisfactory. A comparison of the strong and weak base catalysts is set forth below in Table I and Examples 1–3, inclusive.

It has been postulated that the vinylation reaction involved a nucleophilic attack of an anion on acetylene, as follows:

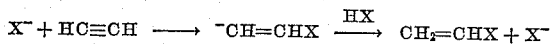

$$X^- + HC\equiv CH \longrightarrow {}^-CH=CHX \xrightarrow{HX} CH_2=CHX + X^-$$

The function of the strongly basic catalysts employed in the prior art is believed to be the generation of the anion from the active hydrogen compound. While the strong bases are excellent catalysts for vinylation in numerous instances, there are certain cases when their use is prohibited. One such case has been mentioned above. In general, however, it may be stated that such a prohibition is indicated when secondary functional groups which are unstable to strong bases are present in the substrate to be vinylated. In such cases the secondary functional groups react with the catalyst and the latter is thus inactivated by being converted to a non-catalytic species.

When this problem was recognized an attempt was made to solve it by vinyl transfer reactions. The results were unpromising and it became apparent that some other method or material had to be found for the facile preparation of vinylation sulfides from vinyl substrates having secondary functionalities which were sensitive to strong bases. A number of substances were considered in a search for at least one which would work, and among them were the carbonic acid salts. Both sodium carbonate and sodium bicarbonate were tried. It was found that sodium bicarbonate would not work at all. Sodium carbonate, however, was found to function very well, but only in an aqueous solution; it would not function in the anhydrous form, and it would not work in the presence of ethanol. Either catalytic or stoichiometric quantities of aqueous sodium carbonate will effect the vinylation of mercaptans. As a rule, it has been found that from 0.01 to 1 mole of the catalyst to 1 mole of the mercaptan is a practical range, and that a preferred ratio is 0.02 to 0.1 mole of the catalyst to 1 mole of the mercaptan. Data illustrative of the foregoing observations are set forth in Table I–IV, inclusive, and in Example 1 to 7, inclusive, below.

TABLE I.—VINYLATION OF n-BUTYL MERCAPTAN WITH CARBONATE SALTS

| Salt | Moles | Solvent, Grams | Mercaptan, Moles | $C_2H_2$ Absorbed in Moles | Time, Hrs. | Temp., °C. | Yield, percent Vinyl Sulfide | Yield, percent Adduct [1] |
|---|---|---|---|---|---|---|---|---|
| $Na_2CO_3$ | 0.2 | $H_2O$, 100 | 0.2 | 0.19 | 1.1 | 124–133 | 55 | 10 |
| $Na_2CO_3$ | 0.2 | EtOH, 78 | 0.2 | 0.04 | 1.0 | 134–137 | 0 | 0 |
| $NaHCO_3$ | 0.2 | $H_2O$, 100 | 0.2 | 0.00 | 1.3 | 125–136 | 0 | 0 |

[1] This mercaptan adduct is formed by the addition of the mercaptan to the vinyl sulfide first formed. It is frequently encountered in the vinylation of mercaptans.

The data set forth in Table I was obtained from the processes disclosed in the following Examples 1–3, inclusive:

*Example 1.—Vinylation of n-butyl mercaptan with aqueous sodium carbonate*

Acetylene (5.2 g., 0.2 mole) was pressed into a mixture of n-butyl mercaptan (18 g., 0.2 mole) and aqueous sodium carbonate (29 g., 0.2 mole/100 cc. water) at a temperature of 124–133° C. under 400–500 p.s.i.g. in a period of one hour. The acetylene was absorbed by the mixture. The two-phase crude reaction product was separated and the oil layer distilled to give n-butyl vinyl sulfide, boiling point 70° C./60 mm. (13 g., 0.11 mole, 55% yield).

*Example 2.—Ineffectiveness of sodium carbonate in alcohol vinylation catalyst*

Sodium carbonate (29 g., 0.2 mole) was suspended in a solution of butyl mercaptan (18 g., 0.2 mole) in ethanol (78 g.,). The mixture was agitated at 134–145° C. over a period of one hour under acetylene pressure of about 500 p.s.i.g. No acetylene was absorbed above that expected for gas saturation of the solution and no vinylation products were isolated.

*Example 3.—Ineffectiveness of sodium bicarbonate in water as vinylation catalyst*

A mixture of butyl mercaptan (18 g., 0.2 mole) and sodium bicarbonate (16.8 g., 0.2 mole) in water (100 g.)

was agitated at 125–136° C. for 1.3 hours under acetylene pressure of 450–500 p.s.i.g. No absorption occurred and 90% of the butyl mercaptan was recovered unchanged.

In like manner there were prepared the compounds identified in Table II which follows:

TABLE II.—VINYL SULFIDES, RSCH=CH$_2$

| R | Formula | ° C. | mm. | $n_D^{25}$ | $d_{25}^{25}$ |
|---|---|---|---|---|---|
| CH$_3$— | C$_3$H$_6$S | 68 | 760 | 1.4826 | 0.9002 |
| C$_2$H$_5$— | C$_4$H$_8$S | 92 | 760 | 1.4735 | 0.8749 |
| n—C$_4$H$_9$— | C$_6$H$_{12}$S | 70 | 60 | 1.4738 | 0.8728 |
| s—C$_4$H$_9$— | C$_6$H$_{12}$S | 74 | 115 | 1.4687 | 0.8581 |
| C$_4$H$_9$CH(C$_2$H$_5$)CH$_2$— | C$_{10}$H$_{20}$S | 89 | 10 | 1.4602 | 0.8655 |
| n—C$_{14}$H$_{29}$— | C$_{16}$H$_{32}$S | 105 | 0.15 | | |
| C$_6$H$_{11}$(cyclohexyl)— | C$_8$H$_{14}$S | 71 | 9 | 1.5097 | 0.9492 |
| C$_6$H$_5$CH$_2$— | C$_9$H$_{10}$S | 98 | 10 | 1.5773 | 1.0378 |
| C$_6$H$_5$CH$_2$CH$_2$— | C$_{10}$H$_{12}$S | 98 | 10 | 1.5612 | 1.0070 |
| C$_6$H$_5$OCH$_2$CH$_2$— | C$_{10}$H$_{12}$OS | 89 | 0.65 | 1.5633 | 1.0791 |
| (CH$_2$)$_4$(SCH=CH$_2$)$_2$— | C$_8$H$_{14}$S$_2$ | 80 | 0.6 | 1.5443 | 1.0116 |
| ⟨O⟩—CH$_2$— | C$_7$H$_{12}$OS | 84 | 10.5 | 1.5097 | 1.0393 |
| ⟨S⟩—CH$_2$— | C$_7$H$_8$S$_2$ | 78 | 3 | 1.5972 | 1.1863 |

TABLE III.—VINYLATION OF MERCAPTOBENZOTHIAZOLE WITH CARBONATE SALTS

| Catalyst | Moles | Mercaptan, Moles | Solvent, Grams | C$_2$H$_2$ Absorbed, Moles | Time, Hrs. | Temp., ° C. | Conversion [1] | Yield [1] |
|---|---|---|---|---|---|---|---|---|
| NaOH | 0.21 | 0.2 | H$_2$O, 100 | 0.38 | 1.25 | 110–144 | 20 | 40 |
| NaOH | 0.21 | 0.2 | H$_2$O, 100 | 0.38 | 3.0 | 130–142 | 33 | 40 |
| Na | 0.2 | 0.2 | MeOH, 90 | | 1.0 | 100–126 | 9 | |
| Na | 0.02 | 0.2 | MeOH, 90 | | 1.0 | 116–132 | 0 | 0 |
| Na$_2$CO$_3$ | 0.2 | 0.2 | H$_2$O, 100 | 0.19 | 3.0 | 136–140 | 78 | 80 |
| Na$_2$CO$_3$ | 1.5 | 1.5 | H$_2$O, 700 | 0.93 | 4.0 | 140–148 | 84 | 84 |

[1] Conversion and yields are based on 2-mercaptobenzothiazole. The data set forth in Table III was obtained from the process disclosed in Example 4 discussed below.

*Example 4.—Effectiveness of sodium carbonate as vinylation catalyst*

Two hundred fifty-two grams (1.5 moles) of 2-mercaptobenzothiazole were charged to a 3-liter, stirred autoclave as a slurry with a solution prepared from sodium carbonate (159 g., 1.5 moles) in 700 cc. of water. The mixture was heated under slight acetylene pressure to 140° C. Over a period of three hours acetylene was pressed in at 450–475 p.s.i.g. The two-phase reaction mixture was cooled, discharged from the autoclave, and the oil layer (278 g.) was flash-distilled (at 0.4 mm. to a pot temperature of 210° C.) into a Dry Ice-acetone cooled receiver to give a yellow distillate (266 g.) and some holdup (12 g.). The flash distillate was further rectified to give 2-vinylthiobenzothiazole (241 g., 1.25 moles, 83.5% of theoretical) as a bright yellow oil, boiling range 105° C./0.42 mm.–111° C./0.47 mm., $n_D^{25}$ 1.6833, $d_{25}^{25}$ 1.2607

Calculated for C$_9$H$_7$NS$_2$: C, 55.92; H, 3.65; S, 33.17; M$_D$, 57.85. Found (heart cut): C, 56.17; H, 3.65; S, 33.02; M$_D$, 58.33.

The foregoing and other experiments with sodium carbonate have led to the discovery of a number of additional characteristics of aqueous sodium carbonate, and other like weak base catalysts useful for vinylating mercaptans, some of which afford certain advantages. The aqueous nature of the mercaptan vinylation process facilitates the recovery of the product since the vinyl sulfide separates quite readily as an oil layer. By comparison, when alcohols, etc. are employed as solvents they usually must be removed by a much more complex distillation operation. The presence of water, incidentally, is absolutely essential to the unique and successful operation of this invention. However, it should be understood that no large amount of water is needed and, at the other extreme, an excess is harmless. Sufficient water should be present to start the catalysis of the reaction, and to permit separation of the catalyst as an aqueous layer from the organic product layer. The use of from 0.1 mole to 5 moles of water per mole of mercaptan has been found to be preferable.

Another characteristic fact of the invention is that only a catalytic amount of the weak base is needed, as shown in Example 5. I have found, further, that sodium carbonate and other such weakly basic catalysts which are effective in vinylating mercaptans are incapable of effecting the vinylation of alcohols and amides. This characteristic has made it possible, in a di-functional system such as mercapto-ethanol, in which both O- and S-vinylations can occur when strongly basic catalysts are employed, to eliminate the undesirable O-vinylation by using sodium carbonate.

*Example 5.—Effectiveness of sodium carbonate as vinylation catalyst*

Acetylene (9 g., 0.35 mole) was pressed into a solution of mercaptoethanol (40 g., 0.52 mole) and sodium carbonate (5.4 g., 0.051 mole) in water (94 g.) over a period of seventy-three minutes at 114–140° C. under 400–500 p.s.i.g. The two-phase reaction product was separated to give 2-hydroxyethyl vinyl sulfide (38.8 g., 0.39 mole, 75% yield).

In seeking to determine which of the weakly basic salts will function as a mercaptan vinylation catalyst, I have discovered a convenient means for their classfication and selection for such a purpose based upon their hydrolysis constants ($K_h = K_w/K_a$). For example, the hydrolysis constant for sodium carbonate is $1.7 \times 10^{-4}$, while that for sodium bicarbonate is $2.3 \times 10^{-8}$. Any salt with a hydrolysis constant less than $10^{-8}$ certainly certainly would not be effective as an aqueous vinylation catalyst for all mercaptans. (For example, I have found that sodium acetate, $K_h$ $5.7 \times 10^{-10}$, is ineffective.) My investigations have shown that a salt which has a hydrolysis constant that is in the range of $10^{-2}$ to $10^{-7}$ will be satisfactory. Thus for convenience of reference in this specification, it should be understood that a salt which has a hydrolysis constant in this range is considered to be a weakly basic salt which can function as a mercaptan vinylation catalyst. The representative listings in Table IV, and Examples 6, and 7, illustrate how this simple means of selection works:

TABLE IV.—HYDROLYSIS CONSTANTS OF REPRESENTATIVE SATISFACTORY AND UNSATISFACTORY WEAKLY BASIC CATALYSTS

| Salt | $K_h$ | Catalytic Behavior |
|---|---|---|
| Trisodium phosphate | $2.1 \times 10^{-2}$ | Satisfactory. |
| Sodium carbonate | $1.7 \times 10^{-4}$ | Do. |
| Sodium cyanide | $1.4 \times 10^{-5}$ | Do. |
| Sodium borate | $1.7 \times 10^{-5}$ | Do. |
| Disodium hydrogen phosphate | $1.6 \times 10^{-7}$ | Do. |
| Sodium bicarbonate | $2.3 \times 10^{-8}$ | Unsatisfactory. |
| Sodium acetate | $5.7 \times 10^{-10}$ | Do. |

Example 6.—Vinylation with trisodium phosphate as catalyst

Acetylene (24 g., 0.9 mole) was pressed into an agitated mixture of phenethyl mercaptan (138 g., 1.0 mole) in 100 cc. of water containing trisodium phosphate (16 g., 0.1 mole) at 125–140° C. over a period of fifty minutes under 450–50 p.s.i.g. The cool reaction product was separated and the organic layer distilled to give phenylethyl vinyl sulfide (120 g., 0.8 mole, 80% yield.)

Example 7.—Vinylation with disodium hydrogen phosphate as catalyst

Over a period of one hour acetylene (4.9 g., 0.19 mole) was pressed into an agitated mixture of mercaptoethanol (15.6 g., 0.2 mole), disodium hydrogen phosphate heptahydrate (53.7 g., 0.2 mole) under 400–450 p.s.i.g. The temperature was maintained at 119–137° C. The reaction product, when cooled, was in two phases. Separation of the organic layer gave 2-hydroxyethyl vinyl sulfide (18.8 g., 0.18 mole, 90% yield).

Ammonia and numerous weakly basic amines have also been found to give good to excellent results as catalysts for the mercaptan vinylation reaction. However, some members of this category, e.g., aniline and piperidine, were also found to be essentially ineffective. I have determined that the members of this group which will perform satisfactorily are those having a dissociation constant, $K_b$, in the range of $10^{-3}$ to $10^{-8}$, inclusive. Included in this class of catalysts are ammonia and many primary, secondary, and tertiary amines, such as N-methyl morpholine) mixed primary-secondary amines (such as triethylene-tetramine), and aminoalcohols (such as N-ethyldiethanolamine, N-benzyldiethanolamine, N,N-dimethylethanolamine, N,N-dimethylisopropanolamine, and triethanolamine), as will be seen from Tables V and VI. The amines, it should be noted, also have made it possible to eliminate the undesirable O-vinylations and obtain the sought for S-vinylations in a di-functional system, just as described above with reference to the weakly basic salt catalysts of this invention.

A number of ion-exchange resins also may be included in this category of successful catalysts which are selectable by virtue of their having dissociation constants which fall within the $10^{-3}$ to $10^{-8}$ range. For example, suitable ion-exchange resins are chloromethylated and aminolyzed styrene divinyl benzene copolymers and aminolyzed cross-linked acrylic type polymers such as are indicated in Table V and in Examples 18–19–20. The ion-exchange resins have all the advantageous uses described above for the weakly basic and amine type catalysts, as well as certain other advantages which will be readily apparent to those skilled in the art.

The list in Table V illustrates how simple it is to select a satisfactory amine or ion-exchange type catalyst, based on its dissociation constant.

TABLE V.—DISSOCIATION CONSTANTS OF REPRESENTATIVE SATISFACTORY AND UNSATISFACTORY AMINE AND ION-EXCHANGE TYPE CATALYSTS

| Catalyst | $K_b$ | Catalytic Behavior |
|---|---|---|
| Ammonia | $1.8 \times 10^{-5}$ | Satisfactory. |
| Primary amines: | | |
| Ethylamine | $5.6 \times 10^{-4}$ | Do. |
| n-Propylamine | $4.7 \times 10^{-4}$ | Do. |
| Isopropylamine | $5.3 \times 10^{-4}$ | Do. |
| Butylamine | $4.1 \times 10^{-4}$ | Do. |
| Ethylenediamine | $8.5 \times 10^{-5}$ | Do. |
| Tetramethylenediamine | $5.1 \times 10^{-4}$ | Do. |
| Benzylamine | $2.0 \times 10^{-5}$ | Do. |
| Secondary amines: | | |
| Dimethylamine | $5.2 \times 10^{-4}$ | Do. |
| Diethylamine | $1.3 \times 10^{-3}$ | Do. |
| Diisobutylamine | $4.8 \times 10^{-4}$ | Do. |
| Morpholine | $1.6 \times 10^{-3}$ | Do. |
| Tertiary amines: | | |
| Triethylamine | $6.4 \times 10^{-4}$ | Do. |
| Dimethylbenzylamine | $1 \times 10^{-5}$ | Do. |
| Aminoalcohols: Methyldiethanolamine | $2.8 \times 10^{-5}$ | Do. |
| Ion-exchange resins: | | |
| Cross-linked polyethylacrylate diethylenetriamine.[1] | $1 \times 10^{-5}$ | Do. |
| Cross-linked polymethylacrylate dimethylaminopropylamine.[1] | $6.3 \times 10^{-7}$ | Do. |
| Chloromethylated styrenedivinyl benzene-diethylenetriamine.[2] | $3.1 \times 10^{-8}$ | Do. |
| Aromatic amines: | | |
| p-Toluidine | $2 \times 10^{-9}$ | Unsatisfactory. |
| β-Naphthylamine | $2 \times 10^{-10}$ | Do. |
| Diphenylamine | $7.6 \times 10^{-14}$ | Do. |
| Aniline | $3.8 \times 10^{-10}$ | Do. |
| Piperidine | $1.4 \times 10^{-9}$ | Do. |

[1] As disclosed in U.S. Patent No. 2,675,359.
[2] As disclosed in U.S. Patent No. 2,591,574.

Data illustrative of the effectiveness as catalysts of the amines listed above will be found in Table VI. It should be noted that, the same ranges of catalyst to mercaptan, and quantities of water required are applicable with the amines as were indicated above in connection with the weakly basic salts. Additional factors having applicability to both types of catalyts are: (a) a suitable temperature range of 100–180° C., although 120–150° C. represents a preferred range; and (b) the introduction of acetylene to the described reactions at a pressure ranging from atmospheric to 500 p.s.i. The acetylene can be concentrated or diluted with an inert gas for acetylene solvent in accordance with practices well known to the art.

TABLE VI.—AMINE CATALYSTS FOR VINYLATION OF MERCAPTANS

| Catalyst | Moles | Mercaptan [1] | | $C_2H_2$ Absorbed, Moles | Time, Hrs. | Temp., 0° C. | Yields, percent | |
|---|---|---|---|---|---|---|---|---|
| | | Structure | Moles | | | | Vinyl Sulfide | Adduct [2] |
| $NH_3$ | 1.13 | Bu | 0.56 | 0.4 | 1.5 | 123 | 39 | 46 |
| $n\text{-}C_4H_9NH_2$ | 1.0 | ME | 1.0 | 0.93 | 1.5 | 127–149 | 72 | |
| $C_6H_5CH_2NH_2$ | 1.0 | TG | 1.0 | 0.39 | 1.0 | 130–140 | 26 | |
| 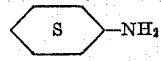 | 1.0 | ME | 1.0 | 0.58 | 1.5 | 128–144 | 45 | |
| $(C_2H_5)_2NH$ | 1.0 | ME | 1.0 | 1.2 | 4.0 | 130–150 | 54 | |
| $(CH_3)_3N$ | 0.4 | Bu | 0.36 | 0.7 | 1.0 | 115–120 | 66 | 34 |
| $(CH_3)_3N$ | 1.97 | Bu | 1.67 | 6.1 | 2.5 | 115–141 | 86 | |
| $NH_2(C_2H_4NH)_3H$ | 0.5 | ME | 0.334 | 1.34 | 0.73 | 118–130 | 58 | |
| $CH_3N(CH_2CH_2OH)$ | 0.5 | Bu | 0.5 | 0.65 | 1.0 | 120–128 | 82 | |
| I.E. resin [3] | 0.1 | ME | 1.0 | 1.08 | 1.5 | 125–130 | 60 | |
| $C_6H_5NH_2$ | 0.5 | Bu | 0.5 | 0.04 | 1.0 | 122–129 | 0 | |
| $C_5H_5N$ | 0.5 | Bu | 0.5 | 0.12 | 1.5 | 124–129 | 0 | |

[1] Mercaptan structure legned: Bu=n-butyl mercaptan; ME=mercaptoethanol; TG=monothioglycerol.
[2] This mercaptan adduct is formed by the addition of the mercaptan to the vinyl sulfide first formed. It is frequently encountered in the vinylation of mercaptans.
[3] Cross-linked polyamino-polyacrylamide ion-exchange resin.

The data set forth in Table VI was obtained primarily from the processes disclosed in the following Examples 8-20 inclusive.

*Example 8.—Ammonium hydroxide as catalyst for vinylation of butyl mercaptan*

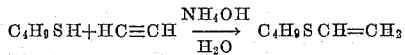

A two-phase mixture of butyl mercaptan (50.6 g., 0.56 mole) and 28% aqueous ammonium hydroxide (69 g., 1.13 moles) was charged to a magnetically stirred autoclave. The vapor space was swept with nitrogen and acetylene. The reactor and contents were heated to 123° C. Acetylene (10.4 g., 0.4 mole) was pressed in at 400-500 p.s.i.g. over a period of 1.5 hours. The reaction product was in two phases.

The upper oil layer was separated and distilled through a packed column to give butyl vinyl sulfide (25 g., 0.22 mole), boiling point 69.5° C./60 mm. The yield of butyl vinyl sulfide was 39%.

The distillation residue was identified as 1,2-bis(butylthio)ethane (28 g., 0.13 mole, 46% yield).

*Example 9.—Butylamine as a catalyst for the vinylation of mercaptoethanol*

Mercaptoethanol (78 g., 1.0 mole), n-butylamine (73 g., 1.0 mole), and water (18 g., 1.0 mole) were mixed to give a homogeneous solution. At elevated temperature (127-149° C.) and pressure (400-500 p.s.i.g.) over a period of 1.5 hours, the solution absorbed acetylene (24.2 g., 0.93 mole). The reaction products were distilled through a 0.5 x 20" Vigreux column to give (a) butylamine (71.3 g., 0.98 mole), boiling range 77° C./atm.-42° C./100 mm., 98% recovery, and (b) 2-hydroxyethyl vinyl sulfide (74.6 g., 0.72 mole, 72% yield).

*Example 10.—Diethylamine as catalyst for the vinylation of mercaptoethanol*

A solution of mercaptoethanol (78 g., 1.0 mole), diethylamine (73 g., 1.0 mole), and water (18 g., 1.0 mole), contained in a magnetically stirred autoclave, absorbed acetylene (30 g., 1.2 moles) at elevated temperature (130-150° C.) and pressure (350-500 p.s.i.g.) over a period of four hours. The homogeneous reaction product was distilled to give the following fractions:

| Fraction Charge | Gms. 202 | B. R., ° C./mm. | Pot Temp., ° C. | Composition |
|---|---|---|---|---|
| 1 | 66 | 55-47/atm | 80 | Diethylamine—93.3%. Water—6.7%. |
| 2 | 25 | 57/atm.-45/35 | 90 | Diethylamine—40%. Water—60%. |
| 3 | 56 | 72-3/5 | 82 | 2-hydroxyethyl vinyl sulfide. |
| Residue | 20 | | | |

The yield of 2-hydroxyethyl vinyl sulfide was 54%.

*Example 11.—Aqueous trimethylamine as catalyst for vinylation of butyl mercaptan*

A two-phase mixture of butyl mercaptan (32 g., 0.36 mole) and 25% aqueous trimethylamine (94 g., 0.4 mole) was charged to a Magne-Dash. After flushing the vapor space with nitrogen and acetylene, the reactor and contents were heated to 115-120° C. Acetylene (18 g., 0.7 mole) was pressed in at 400-500 p.s.i.g. over a period of one hour. The reaction product was in two phases.

The upper oil layer was separated and distilled through a packed column to give butyl vinyl sulfide (24 g., 0.21 mole). The yield of butyl vinyl sulfide was 65.5%.

The distillation residue (12 g., 0.12 mole, 36.2% yield) was identified as 1,2-bis(butylthio)ethane.

*Example 12.—Aqueous trimethylamine as catalyst for vinylation of butyl mercaptan*

A two-phase mixture of butyl mercaptan (150 g., 1.67 moles) and 25% aqueous trimethylamine (464 g., 1.97 moles) was charged to a one-liter stirred autoclave. The reaction mixture was heated to 115-141° C. and acetylene (159 g., 6.1 moles) was pressed in at 400-500 p.s.i.g. over a period of 2.5 hours.

The reaction product was in two phases. The upper layer was separated and flash-distilled (to 85° C./1 mm.) to give a clear distillate (210 g.) and a dark residue (84 g.). Refractionation of the distillate gave butyl vinyl sulfide (166 g., 1.43 moles, 86% yield).

*Example 13.—Cyclohexylamine as catalyst for the vinylation of mercaptoethanol*

A solution of mercaptoethanol (78 g., 1.0 mole), cyclohexylamine (99 g., 1.0 mole), and water (1.0 mole) absorbed acetylene (15 g., 0.58 mole) over a period of 1.5 hours at elevated temperature (128-144° C.) and pressure (400-500 p.s.i.g.). The reaction product was fractionated to give (a) cyclohexylamine (59 g., 0.6 mole, 60% recovery), and (b) 2-hydroxyethyl vinyl sulfide (47 g., 0.45 mole, 45% yield), boiling range 56-49° C./2.5 mm.

*Example 14.—Benzylamine as a catalyst for the vinylation of monothioglycerol*

Acetylene (10.5 g., 0.39 mole) was absorbed over a period of one hour at elevated temperature (130-140° C.) by a solution of monothioglycerol (108 g., 1.0 mole), benzylamine (107 g., 1.0 mole), and water (18 g., 1.0 mole) contained in a magnetically stirred autoclave. The reaction mixture was distilled from a Claisen flask to (a) benzylamine (98 g., 0.92 mole, boiling range 31-40° C./1.2 mm., 92% recovery), and (b) a fraction, boiling range 87-89° C./25 mm., which was found on analysis to be a mixture of monothioglycerol (43.5%, 26.8 g.) and α-vinyl thioglycerol (56.5%, 34.7 g., 0.26 mole, 26% conversion).

*Example 15.—Triethylenetetramine as catalyst for vinylation of mercaptoethanol*

Mercaptoethanol (104 g., 1.34 moles), triethylenetetramine (48.7 g., 0.334 mole), and water (24.2 g., 1.34 moles) were combined to form a homogeneous solution. The reaction mixture was heated to 118-130° C. and acetylene (19 g., 0.73 mole) pressed in at 400-500 p.s.i.g., was absorbed over a period of seven hours. Water was stripped from the homogeneous reaction product, and the residual oil was distilled to give 2-hydroxyethyl vinyl sulfide (80.5 g., 0.77 mole, 57.5% yield).

*Example 16.—N-methyldiethanolamine as catalyst for vinylation of butyl mercaptan*

A mixture of N-methyldiethanolamine (60 g., 0.5 mole), butyl mercaptan (45 g., 0.5 mole), and water (18 g., 1.0 mole) was charged to a magnetically stirred autoclave. After flushing with nitrogen and acetylene, the reactor and contents were heated to 120-128° C. Acetylene (17 g., 0.65 mole) was pressed in at 400-500 p.s.i.g. over a period of one hour. The reaction products were in two phases.

The upper layer (63 g.) was distilled directly through a 1/2 x 12" Vigreux column to give butyl vinyl sulfide (49 g., 0.41 mole), boiling range 67-71° C./60 mm. The yield of vinyl sulfide was 82%.

The lower layer (73 g.) was mixed with additional butyl mercaptan (45 g., 0.5 mole) and treated with acetylene at elevated temperature and pressure in a second cycle, in the same manner as described above. Butyl vinyl sulfide (45 g., 0.39 mole) was obtained by distillation of the upper layer.

*Example 17.—N-methyldiethanolamine as catalyst for for vinylation of mercaptoethanol*

A solution of mercaptoethanol (39 g., 0.5 mole) in N-methyldiethanolamine (60 g., 0.5 mole) containing a small amount of water (1 cc.) was heated to 118–125° C. in a magnetically stirred autoclave. Acetylene (13 g., 0.5 mole) was pressed in from a calibrated reservoir (450–500 p.s.i.g.) over a period of forty minutes.

The reaction products were homogeneous, and were distilled directly through a 1/2 x 12" Vigreux column. 2-hydroxyethyl vinyl sulfide (32 g., 0.31 mole) was obtained as a clear, water-white liquid, boiling range 85–89° C./20 mm. The yield of vinyl sulfide was 62%.

*Example 18.—Ion-exchange resins as catalysts for vinylation of mercaptoethanol or benzyl mercaptan*

An ion-exchange resin made from diethylenetriamine and ethyl acrylate, cross-linked with 5% divinylbenzene (26.1 g., 39.5% solid, AEC—9.68 meq./g. dry), the resin being equivalent to 0.1 mole of nitrogen, was swollen with water (15.7 g., 0.88 mole). The wet resin was mixed with mercaptoethanol (78 g., 1.0 mole) in a magnetically stirred autoclave. Over a period of 1.5 hours acetylene (28 g., 1.08 moles) was pressed in at 400–500 p.s.i.g., while maintaining the temperature at 125–150° C.

The ion-exchange resin was filtered from the reaction mixture and leached with ethanol (50 cc.). The resin was dried to constant weight (14 g.).

The liquid products were distilled through a 0.5 x 20" Vigreux column to give 2-hydroxyethyl vinyl sulfide (62 g., 0.60 mole, 60% yield).

*Example 19*

An ion-exchange resin comprising an ethyl acrylate-divinylbenzene copolymer aminolyzed with methylaminopropylamine (36.4 g., 50% solids, AEC—5.5 meq./g. dry), the resin being equivalent to 0.1 mole of tertiary nitrogen, was stirred and heated in an autoclave with benzyl mercaptan (24.8 g., 0.2 mole) under 450–500 p.s.i.g. of acetylene. Over a period of 1.5 hours, acetylene (14.7 g., 0.2 mole) was absorbed.

The ion-exchange resin was filtered off, the two-phase reaction product was separated, and the oil layer gave benzyl vinyl sulfide (21.0 g., 0.14 mole, 70% yield, boiling point 98° C./10 mm.).

*Example 20*

An ion-exchange resin comprising a styrene-divinylbenzene copolymer chloromethylated and aminolyzed with diethylenetetramine (37.0 g., 60% solids, AEC—4.5 meq./g. dry), the resin being equivalent to 0.1 mole of nitrogen, water (18.0 g., 1.0 mole) and mercaptoethanol (78.0 g., 1.0 mole), was agitated in a magnetically stirred autoclave under acetylene pressure (500 p.s.i.g.). Over a period of 2.0 hours acetylene (25 g., 0.96 mole) was absorbed at 150–155° C.

The ion-exchange resin was filtered off and rinsed with water. The two-phase liquid reaction product was separated and distillation of the oil layer gave 2-hydroxyethyl vinyl sulfide (70.0 g., 0.67 mole, 76% yield).

As in the case of sodium carbonate and the related effective catalysts such as were identified in Table IV, water is necessary, at least in trace amounts, for proper catalytic action of the amines. Numerous attempts to vinylate mercaptans were made with alcoholic amines, and with the anhydrous form of amine catalysts that had proven to be so effective in the presence of some water; all were unsuccessful.

The use of the amine-based ion-exchange resin as a catalyst is of particular interest because of its exceptional applicability to and utility in continuous processing systems of vinylation by means of acetylene which, obviously, will find great value in commercial production. The advantage lies in the use of the catalyst in a fixed bed, and the elimination of the need to circulate the catalyst or to recycle large amounts of the solvent. The ion-exchange catalyst remains fixed in the reactor. The product is simply drawn off as a liquid mixture free of catalyst from which the pure product is easily obtained by fractional distillation or other appropriate method. This is much simpler and cheaper than the complicated stripping operations which are required by the prior art for the recovery and recycling of strongly basic catalysts.

SUMMARY

From the foregoing, it will be seen that I have provided a unique and superior method for vinylating mercaptans. My novel process is predicated upon the use of certain weakly basic catalysts which make possible the desired vinylation reaction without the undesirable side reactions that are characteristic of such otherwise base sensitive systems. A further unique characteristic of the present invention is the critical requirement of an aqueous system. Still another unusual characteristic is the fact that the use of the weakly basic salts, amines, and ion-exchange resin type catalysts disclosed as effective in vinylating mercaptans is selective in nature because those catalysts are incapable of effecting the vinylation of alcohols and amides. This fact has made it possible, in a di-functional system in which both O- and S-vinylations can occur when strongly basic catalysts are employed, to eliminate the undesirable O-vinylation. The invention is capable of numerous modifications beyond the specific examples herein given by way of illustration. Those skilled in the art will readily recognize the obvious ways in which those modifications can be practiced within the scope of the present invention. Hence, I do not wish to be limited to the disclosure per se, but only by the claims appended below.

I claim:

1. The process of producing vinyl sulfides which comprises acting on a mercaptan with acetylene in the presence of an aqueous solution of a compound from the group consisting of (a) a weekly basic salt having an hydrolysis constant of between $10^{-2}$ and $10^{-7}$, inclusive, and (b) ammonia and weakly basic amines having a dissociation constant of between $10^{-3}$ and $10^{-8}$, inclusive.

2. The process of claim 1 in which the compound in the aqueous solution is sodium carbonate.

3. The process of claim 1 in which the compound in the aqueous solution is butylamine.

4. The process of claim 1 in which the compound in the aqueous solution is morpholine.

5. The process of claim 1 in which the compound in the aqueous solution is dimethylbenzylamine.

6. The process of claim 1 in which the compound in the aqueous solution is methyldiethanolamine.

7. The process of producing vinyl sulfides which comprises intimately contacting a mercaptan with a water-swollen weakly basic ion-exchange resin, said resin having a dissociation constant of between $10^{-3}$ to $10^{-8}$, inclusive, under acetylene pressure up to about 500 p.s.i., removing the ion-exchange resin from contact with the resulting two-phase reaction product, and separating out the oily layer consisting essentially of the vinyl sulfide.

8. The process of claim 7 in which the ion-exchange resin is an acrylic-type copolymer aminolyzed with an aminoalkyl primary amine.

9. The process of claim 7 in which the ion-exchange resin is a styrene-type copolymer which has been chloromethylated and aminolyzed with an alkyl amine.

10. The procss of selectively effecting S-vinylation in a di-functional system in which both O- and S-vinylations potentially can occur simultaneously, said process comprising acting on a mercaptan having hydroxyl groups with acetylene in the presence of an aqueous system incorporating a compound from the group consisting of (a) a water-soluble weakly basic salt having an hydrolysis constant of between $10^{-2}$ and $10^{-7}$, inclusive, (b) ammonia and water-soluble weakly basic amines having a dissociation constant of between $10^{-3}$ and $10^{-8}$, inclusive, and (c) a water-swollen weakly basic ion-exchange resin having a dissociation constant of between $10^{-3}$ and $10^{-8}$, inclusive.

11. The process of claim 10 in which the mercaptan is mercapto-ethanol.

12. The process of claim 10 in which the mercaptan is monothioglycerol.

13. The process of producing vinylthiobenzothiazole which comprises acting on mercaptobenzothiazole with acetylene in the presence of an aqueous solution of a weakly basic salt having a hydrolysis constant of between $10^{-2}$ and $10^{-7}$, inclusive.

14. The process of claim 13 in which the basic salt is sodium carbonate.

15. The process of claim 13, in which the basic salt is tri-sodium phosphate.

References Cited in the file of this patent
UNITED STATES PATENTS 2,081,766    Reppe et al. _____ May 25, 1937